(12) United States Patent
Linn et al.

(10) Patent No.: US 8,255,079 B2
(45) Date of Patent: Aug. 28, 2012

(54) HUMAN GRASP ASSIST DEVICE AND METHOD OF USE

(75) Inventors: Douglas Martin Linn, White Lake, MI (US); Chris A. Ihrke, Hartland, MI (US); Myron A. Diftler, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 479 days.

(21) Appl. No.: 12/564,095

(22) Filed: Sep. 22, 2009

(65) Prior Publication Data

US 2011/0071664 A1    Mar. 24, 2011

(51) Int. Cl.
- *A61H 1/00* (2006.01)
- *G06F 7/00* (2006.01)
- *A63B 23/16* (2006.01)

(52) U.S. Cl. ............... 700/213; 601/5; 601/23; 601/33; 601/40; 482/47; 700/250

(58) Field of Classification Search .......................... None
See application file for complete search history.

(56) References Cited

U.S. PATENT DOCUMENTS

| | | | |
|---|---|---|---|
| 5,117,700 A | 6/1992 | Trechsel | |
| 5,184,319 A | 2/1993 | Kramer | |
| 5,516,249 A | 5/1996 | Brimhall | |
| 5,845,540 A | 12/1998 | Rosheim | |
| 5,967,580 A | 10/1999 | Rosheim | |
| 6,042,555 A | 3/2000 | Kramer et al. | |
| 6,658,962 B1 | 12/2003 | Rosheim | |
| 7,415,735 B2 | 8/2008 | Erickson et al. | |
| 8,029,414 B2 * | 10/2011 | Ingvast et al. | 482/47 |
| 2006/0094989 A1 * | 5/2006 | Scott et al. | 601/5 |
| 2008/0204225 A1 * | 8/2008 | Kitchen | 340/539.22 |
| 2010/0249675 A1 * | 9/2010 | Fujimoto et al. | 601/40 |

OTHER PUBLICATIONS http://robotics.nasa.gov/courses/fall2002/event/oct1/NASA_Robotics_20021001.htm.

* cited by examiner

*Primary Examiner* — Gene Crawford
*Assistant Examiner* — Yolanda Jones
(74) *Attorney, Agent, or Firm* — Quinn Law Group, PLLC

(57) ABSTRACT

A grasp assist device includes a glove portion having phalange rings, contact sensors for measuring a grasping force applied by an operator wearing the glove portion, and a tendon drive system (TDS). The device has flexible tendons connected to the phalange rings for moving the rings in response to feedback signals from the sensors. The TDS is connected to each of the tendons, and applies an augmenting tensile force thereto via a microcontroller adapted for determining the augmenting tensile force as a function of the grasping force. A method of augmenting a grasping force of an operator includes measuring the grasping force using the sensors, encoding the grasping force as the feedback signals, and calculating the augmenting tensile force as a function of the feedback signals using the microcontroller. The method includes energizing at least one actuator of a tendon drive system (TDS) to thereby apply the augmenting tensile force.

17 Claims, 2 Drawing Sheets

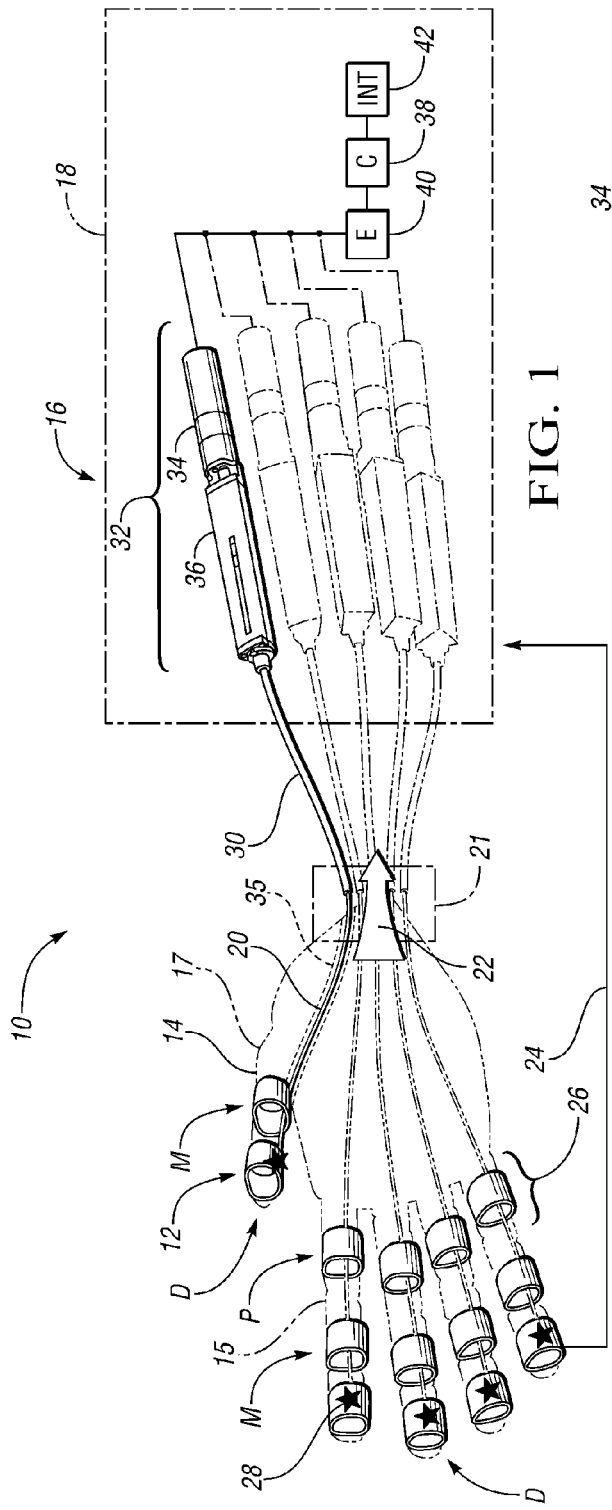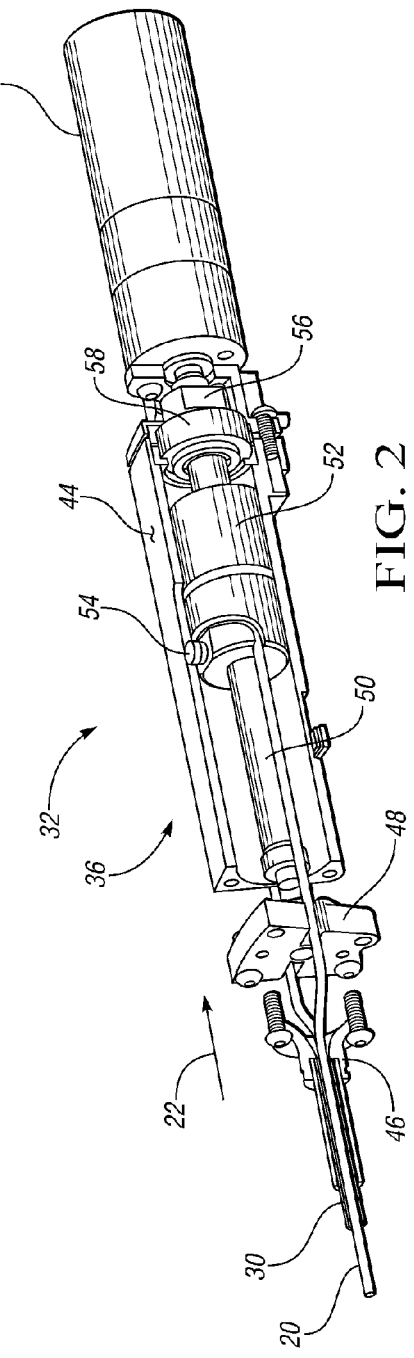

HUMAN GRASP ASSIST DEVICE AND METHOD OF USE

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates generally to ergonomic devices, and in particular to a servo motor-driven device that may be worn by a human user or operator to augment the operator's grasping or grip strength.

BACKGROUND OF THE INVENTION

The field of ergonomics recognizes that repetitive manual operations can degrade the work efficiency of a human operator over time, with the cumulative stresses of repetitive motion potentially affecting the resultant product quality and/or process efficiency. Ergonomics is an evolving scientific discipline that ultimately seeks to understand and improve human interactions with the various pieces of equipment and tools within a work environment, e.g., keyboards, workstations, torque wrenches, control input devices, objects, and the like. Ergonomic design seeks to optimize all aspects of the physical work environment as it relates to human operators therein.

Ergonomic workspace configuration, when performed properly, may help to ameliorate the effects on an operator of some of the more common ergonomic stressors, e.g., repeated monitor viewing, seat height/positioning, and/or tool positioning. However, certain tasks may pose stresses on an operator that may not be lessened given even the most optimal of workplace configurations, for example repetitive manual operations requiring the grasping of an object by the operator. Repetitive grasping may ultimately degrade an operator's grip strength and productivity. Additionally, grip strength of an operator is itself a highly variable quality, with some operators being relatively strong or weak, whether due to stature, injury, or otherwise. Likewise, a given operator's grip strength may vary over time in response to work-related fatigue, potentially leading to relatively inefficient execution of any grasp-related work tasks.

SUMMARY OF THE INVENTION

Accordingly, a lightweight motorized device is provided herein that a user or operator may wear on a hand and forearm to augment the operator's innate ability to flex his or her fingers, thumbs, and various connecting phalanges of a hand, thus optimizing the amount of grasping force applied to an object. The amount of augmenting tensile force provided by the motorized device may be controlled by the user via force-based contact sensors positioned at a distal end of each finger. As the operator exerts a grasping force on an object, a microcontroller, which in one embodiment may be embedded within or connected to a flexible band or strap portion of the device, automatically executes an algorithm to thereby calculate and/or select an optimal amount of augmenting tensile force required for executing the grasping action.

The device may include a glove portion and a motorized tendon drive system, abbreviated TDS hereinafter for simplicity. The TDS is adapted for applying an augmenting tensile force to one or more individual tendons. The tendons may be connected on one end to one or more motorized actuators of the TDS, and at the other end to a respective phalange support ring circumscribing a distal end of a respective finger or thumb of the operator. The contact sensors may be disposed on a respective one of the phalange support rings, and likewise positioned at the distal end of the finger. As the operator presses against an object or tool with the fingers/thumb of the operator's hand, the tendon actuator(s) are automatically activated in response to the measured grasp force.

Once activated, the tendon actuators may exert an augmenting tensile force on the required tendons. This augmenting tensile force pulls on one or more of the tendons and thus shortens the distance between the phalange rings, i.e., the phalange support rings at the distal end of the fingers/thumb, as well as phalange guide rings at the medial and proximal regions of the respective fingers/thumb as described herein. The augmenting tensile force is born by the structure of the device, primarily the phalange rings, and not by the operator's hand. According to one embodiment, the relative or absolute amount of augmenting tensile force may be user-selected up to a maximum value using an interface, and/or may be automatically determined by the microcontroller up to a calibrated maximum value based on the amount of force sensed by the contact sensors. When used with a prosthetic hand or a rigid hand support structure, grasping forces greater than that of a human hand may be achieved.

In particular, a grasp assist device is provided herein that includes a glove portion having a plurality of phalange rings, and having a plurality of sensors each adapted for measuring a grasping force applied to an object by an operator wearing the glove portion. The device also includes a tendon drive system (TDS) and a plurality of flexible tendons connected to the phalange rings, and adapted for moving the phalange rings in response to a set of pressure-related feedback signals from the sensors. The TDS is connected to each of the tendons, and is adapted to apply an augmenting tensile force thereto at a level determined by a microcontroller. The microcontroller may be adapted to execute an algorithm suitable for determining an appropriate level of augmenting tensile force as a function of the measured grasping force, e.g., in proportion thereto or according to another formula, a lookup table, or other suitable means.

A method of augmenting a grasping force of an operator is also provided herein. The method includes measuring a grasping force applied by the operator using force-based contact sensors positioned on a glove portion of a motorized grasp assist device, encoding the grasping force as a set of feedback signals, and then calculating an augmenting tensile force as a function of the feedback signals using a microcontroller. The method also includes energizing at least one actuator of a tendon drive system (TDS) of the device to apply the augmenting tensile force, which is in turn connected to each of the tendons, to thereby move a series of phalange rings of the glove portion.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a servo motor-drive device having a motorized tendon system in accordance with the present invention;

FIG. 2 is a motorized tendon actuator that is usable with the device shown in FIG. 1.

DESCRIPTION OF THE PREFERRED EMBODIMENT

Figure 3:
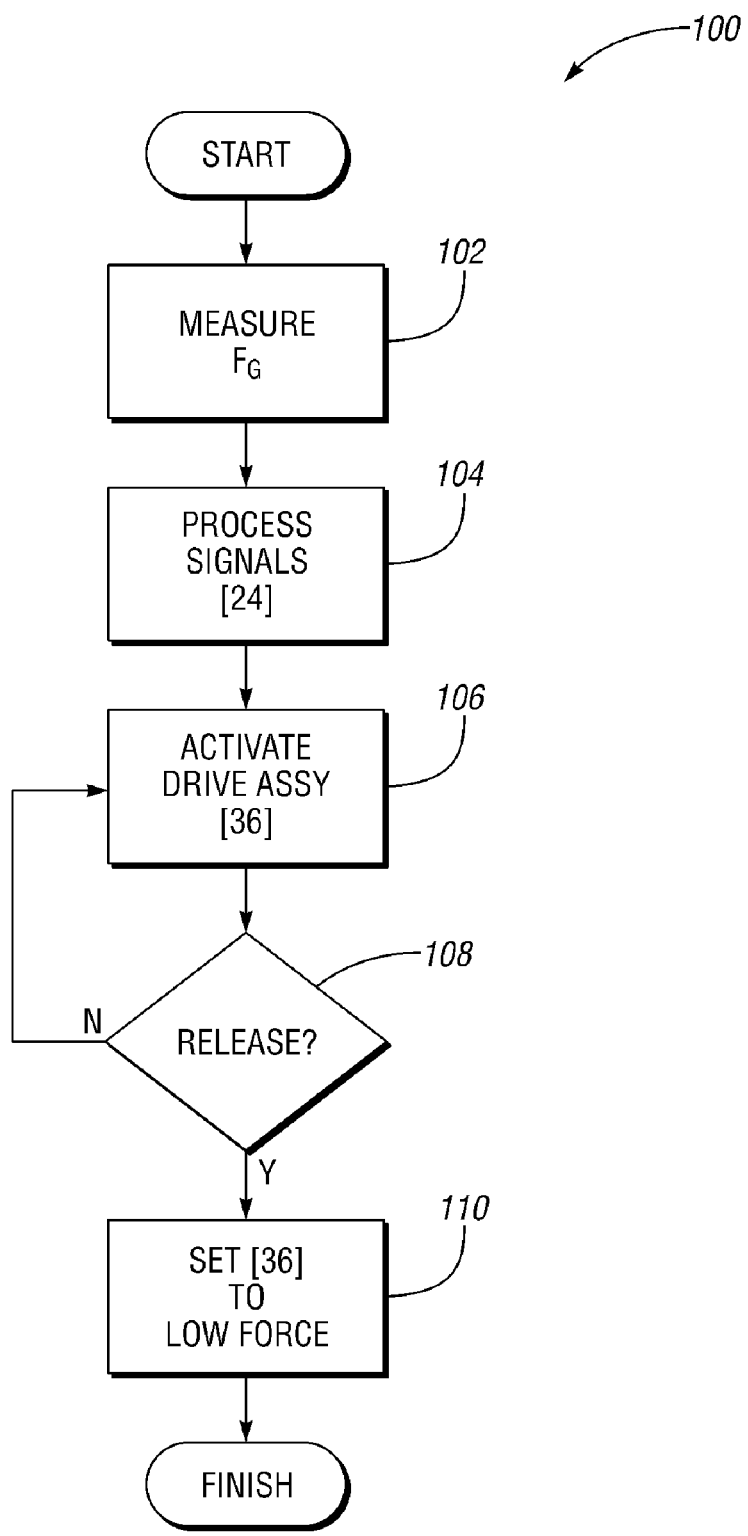
FIG. 3 is a flow chart describing a method of using the device shown in FIG. 1.

With reference to the drawings, wherein like reference numbers refer to the same or similar components throughout the several views, and beginning with FIG. 1, a motorized grasp assist device 10 is adapted for augmenting the ability of an operator to flex the various fingers and phalanges of the operator's hand (not shown). The grasp assist device 10 includes a glove portion 12 constructed of a relatively lightweight material 17 that covers at least the palm side of an operator's hand.

In addition to the glove portion 12, the device 10 includes a tendon drive system (TDS) 16 fully encased or contained at least partially within a flexible sleeve portion 18. The TDS 16 is linked to the glove portion 12 via a set of flexible tendons 20, with an augmenting tensile force (arrow 22) applied to the tendons in response to a feedback signal 24 from the glove portion. The actuation process is described in further detail below with reference to FIG. 3.

The material 17 of glove portion 12 may include a thumb 14 and fingers 15, which an operator may wear in a similar manner to a conventional glove. Connected to the material 17 are a plurality of phalange rings 26 that circumscribe a respective one of the thumb 14 and fingers 15. The glove portion 12 also includes a contact pressure sensor 28 positioned at a distal end of each thumb 14 and finger 15, in a position generally indicated by a corresponding star in FIG. 1. The sensors 28 may be connected to or formed integrally with a respective one of the phalange rings 26, such as the phalange rings positioned at the distal end of each finger 15 and thumb 14. A force exerted by an operator on an object in the operator's grasp activates at least some of the sensors 28. The phalange rings 26 in turn are connected to the tendons 20 that run through the phalange rings, with at least some of the phalange rings acting as guides for the tendons passing therethrough. That is, two types of phalange rings 26 may be provided herein, i.e., the phalange rings (arrow D) positioned at the distal end of each finger 15 and thumb 14, and respective medial (arrow M) and proximal (arrow P) phalange rings. The tendons 20 are terminated at the distal phalange rings, while the medial and proximal phalange rings are primarily used to guide or direct the tendons and to support the operator's finger.

When an object is grasped by an operator, the grasping force or pressure is immediately measured by the contact pressure sensors 28 and relayed as a set of feedback signals 24 to the TDS 16, the sleeve 18 of which may be worn on an operator's forearm (not shown) and secured with hook and loop material, straps, snaps, or any other suitable fastening device(s). In one embodiment, each of the sensors 28 may be configured as a pressure transducer or load cell(s) that precisely measure the amount of contact force between the sensor of a given thumb 14 or finger 15 and an object grasped by the operator.

The TDS 16 is directly connected to each of the phalange rings 26 via the tendons 20, which are disposed and freely moveable within a flexible outer sleeve or conduit 30. In one embodiment, each of the tendons 20 which may be configured as a braided polymer, which in turn may include a high-strength fluorocarbon, in order to increase the wear life of each tendon. However, other materials may also be used without departing from the intended scope of the invention.

The tendons 20 pass through a tendon concentrator 21, which may be located on or near the base of the palm or wrist area of the operator. The tendon concentrator 21 includes conduits that are grounded to the actuator assembly 32 of the TDS 16, as described below, to provide a force load path from the operator's hand to the actuator. The tendons 20 run through the conduit 30 for at least part of the lengths of the tendons, and freely between the concentrator 21 and the phalange rings 28. This arrangement may help isolate the grasping assist motion to the area on the operator's hand from the fingertips to the base of the operator's palm, i.e., isolate the effect of any augmenting tensile force to the area between the concentrator 21 and the phalange rings. From the finger side of the tendon concentrator 21 to the distal phalange rings 28, the tendons 20 may be contained in channels 35 embedded or contained within the material of the glove.

As shown in phantom, multiple actuator assemblies 32 may be configured in an array within the TDS 16, with each assembly 32 acting on a corresponding tendon 20. When only one TDS 16 is used, tendon concentrator 21 may be used to connect the tendons 20 leading from a thumb 14 and each finger 15 to a single actuator tendon, i.e., the tendon shown via solid lines in FIG. 1. In this case, the tendon concentrator 21 provides an area for the multiple tendons 20 to be connected to a single tendon.

Still referring to FIG. 1, the actuator assembly 32 may include a servo motor 34 and a drive assembly 36, e.g., a ball and screw-type device according to one embodiment. The operation of the TDS 16 is explained in further detail herein below. The TDS 16 also includes a micro-controller (C) 38, an energy supply (E) 40, and a user interface (INT) 42, each of which are electrically connected to the controller. The energy supply 40 may be configured as a miniature battery pack, e.g., a lithium ion cell or cells, or any other relatively lightweight or low-mass energy storage device. User interface 42 is configured as an operator control panel, such as a small digital panel, allowing an operator to select a desired amount of augmenting tensile force, as explained below with reference to FIG. 3.

The controller 38 is adapted for processing the set of feedback signals 24 using an algorithm 100 stored therein or accessible thereby, and for calculating or selecting an optimal augmenting tensile force (arrow 22) in response to the values relayed via the feedback signals. This augmenting tensile force (arrow 22) is then applied to some or all of the tendons 20 using the drive assembly 36 to thereby augment the grasp of an operator wearing the device 10.

The controller 38 may include one or more integrated circuits, which may be augmented by various electronic devices such as voltage regulators, capacitors, drivers, timing crystals, communication ports, etc. As will be understood by those of ordinary skill in the art, a microcontroller uses a negligible amount of power, a limited amount of read only memory (ROM), random access memory (RAM), and/or electrically-programmable read only memory (EPROM), and any required input/output (I/O) circuit devices, as well as signal conditioning and buffer electronics. Individual control algorithms resident in the controller 38, or readily accessible thereby, including the algorithm 100 described below with reference to FIG. 3, may be stored in ROM and automatically executed at one or more different control levels to provide the respective control functionality. The controller 38 also takes input from the interface, such as to change the performance and response of the grasp assist system.

Referring to FIG. 2, a partial cross-sectional illustration is shown of actuator assembly 32. The motor 34 is selectively energized by connection to the energy supply 40 (see FIG. 1), as determined by the controller 38 (see FIG. 1). Once energized, the motor 34 may power the drive assembly 36 and apply a tensile force to the tendon 20 as the augmenting tensile force (arrow 22). Such a force may be proportional to the measured grasping force, as explained below, or it may be some other calculated or operator-selected value depending on the particular application.

In one embodiment, the motor 34 may cause a rotation of a ball screw 50 of a ball screw-type drive assembly. In such an embodiment, a ball nut 52 may be used, with the nut 52 having a threaded engagement with the ball screw 50. A guide pin 54 may extend from the ball nut 52 to prevent rotation of the ball nut during any movement of the ball screw 50. Therefore, as the drive assembly 36 rotates the ball screw 50, the ball nut 52 may be translated along the ball screw. The drive assembly 36 may be connected to the ball screw 50 via a coupling 56. Additionally, a radial and thrust bearing 58 may be located between the coupling 56 and the ball screw 50 to reduce friction between an actuator housing 44 and the ball screw.

As noted above, movement of the ball nut 52 on the ball screw 50 pulls on the tendon 20 to thereby exert an augmenting tensile force (arrow 22) on the phalange support rings 26 shown in FIG. 1. The tendon 20 freely moves within the flexible conduit 30 when pulled, with the conduit enclosed by a splitter 46 and connected to the housing 44 via a cap 48.

Referring to FIG. 3, the algorithm 100 may be automatically executed by the controller 38 to calculate or determine an optimal amount of augmenting tensile force to apply to the various tendons 20. The algorithm 100 begins at step 102 wherein the sensors 28 measure a grasping force ($F_G$) of the operator, and transmits the feedback signals 24 to the controller 38. Alternately, the sensors 28 may temporarily store the measurements in memory within the sensor, with the controller 38 reading the values of the stored measurements without transmission of the same by the sensor.

In one embodiment, the sensors 28 may be positioned and configured to sense only the grasping force applied by the operator to an object. In this embodiment, the sensors 28 may be positioned on an inner surface of the distal phalange rings (see arrow D of FIG. 1) to minimize instances of the sensors detecting or measuring the augmenting tensile force generated of the tendons 20. Once the grasping force has been determined, the algorithm 100 proceeds to step 104.

At step 104, the controller 38 processes the signals 24 to determine the optimal amount of augmenting tensile force required by the present grasping action. Step 104 may include any or all of: referencing a previously populated and stored lookup table indexing the measured grasping force with a calibrated value for any required augmenting tensile force, or comparing the measured grasping force from step 102 to a calibrated value and calculating a required augmenting tensile force formulaically based on the variance.

Step 104 may also include checking a desired augmenting tensile force value or percentage of calibrated maximum, which may be manually selected or entered by the operator via the interface 42. For example, an operator may determine that a maximum amount of augmenting tensile force is desired, and the controller 38 may use this selection to automatically adjust the augmenting tensile force so that an applied grasping force, i.e., the sum of the grasping force of the operator and the augmenting tensile force, is always at a calibrated maximum value. Such an option may likewise include the operator having the ability to turn off the application of augmenting tensile force, or to minimize the same, based on the operator's preference. Once the signals 24 have been processed, the algorithm 100 proceeds to step 106.

At step 106, the controller 38 activates the drive assembly 36. In the embodiment utilizing the ball screw 50, step 106 may include transmitting a signal from the controller 38 to the energy supply 40, or to a relay or switch in a power circuit of the energy supply, to thereby energize the ball screw. The augmenting tensile force (arrow 22) is then applied as a proportional tensile force on the tendons 20, that is, the augmenting tensile force may be proportional to the applied grasping force, and the algorithm 100 proceeds to step 108.

At step 108, the algorithm 100 determines whether the operator has released or is presently releasing the object from the operator's grasp. Step 108 may include continuously reading the grasping force values from step 102 and comparing these values to minimum threshold values indicative of a released or sufficiently relaxed grasp. If such a release is detected, the algorithm 100 proceeds to step 110, otherwise repeating steps 106 and 108 in a loop until the release is detected.

At step 110, the controller 38 discontinues application of the augmenting tensile force by setting the motor 34 to a low-power state. The operator is then free to open the fingers 15 and thumb 14 of the operator's hand with minimal resistance from the motor 34. Alternately, the motor 34 may move in an opposite direction to generate slack in the tendon 20 so that negligible resistance is provided to the hand when the grasp is released.

In the case of the device for hand grasp assistance up to the power of a human hand, the grasp load path is expected to be a human hand or a prosthetic hand. Because the grasp load path is a human hand and appendages thereof, the power of the augmentation should be limited. The flexible tendons 20 may be attached to the material 17 located on the palm side of the phalange rings. In the case of a device used for hand grasp assist greater than the strength of the human hand, an additional mechanism should be used to support each phalange. This arrangement may provide an operator employing the device with the capability of having "super human" grasp strength.

While the best modes for carrying out the invention have been described in detail, those familiar with the art to which this invention relates will recognize various alternative designs and embodiments for practicing the invention within the scope of the appended claims.

The invention claimed is:

1. A grasp assist device comprising:
a first portion having fingers that is wearable on a hand of a human operator, wherein the first portion includes a plurality of phalange rings, including, for each finger, at least a medial and a distal phalange ring circumscribing a respective medial and distal phalange of the finger, and at least one sensor configured to measure a grasping force applied via the hand of the operator;
a plurality of tendons each routed through a corresponding one of the medial phalange rings, and connected to a corresponding one of the distal phalange rings of a respective one of the fingers, and configured to apply an augmenting tensile force to the distal phalange ring of the respective finger in response to force feedback signals from the at least one sensor, wherein the force feedback signals encode the grasping force measured by the at least one sensor; and
a second portion that includes:
a tendon drive system (TDS) having a microcontroller; and a plurality of actuator assemblies each connected to a respective one of the tendons, and configured to apply the augmenting tensile force to the respective tendons;

wherein the microcontroller is in communication with the plurality of actuator assemblies, and is configured to calculate the augmenting tensile force as a function of the measured grasping force and to command the calculated augmenting tensile force from the actuator assemblies of the TDS.

2. The device of claim 1, wherein the at least one sensor is configured as a force sensor, and is positioned on a corresponding one of the medial or distal phalange rings.

3. The device of claim 1, wherein the TDS includes a user interface adapted for recording a preferred amount of the augmenting tensile force.

4. The device of claim 1, wherein the TDS includes an energy supply and a servo motor, and wherein the microcontroller is configured to selectively energize the servo motor using the energy supply to thereby generate the augmenting tensile force.

5. The device of claim 4, wherein the TDS includes a drive assembly, and wherein the servo motor is configured to rotate a moveable portion of the drive assembly to thereby generate the augmenting tensile force.

6. The device of claim 1, wherein the glove includes material wearable on the hand of an operator, and wherein the TDS is at least partially enclosed within a sleeve that wraps around a forearm of the operator.

7. A grasp assist device comprising:
a glove having fingers and:
a plurality of phalange rings, including at least a medial and a distal phalange ring on each finger of the glove, wherein each of the phalange rings circumscribes a respective one of the fingers of the glove; and
a plurality of force contact sensors each configured to measure a grasping force applied by an operator that is wearing the glove, and each configured to encode the grasping force as feedback signals;
a plurality of tendons, one per finger of the glove, each connected to a surface of a respective distal phalange ring and each configured to move the medial and distal phalange rings of a respective finger in response to the feedback signals; and
a sleeve containing a tendon drive system (TDS) connected to the tendons, and configured to apply an augmenting tensile force thereto;
wherein the TDS includes a microcontroller configured to calculate the augmenting tensile force as a function of the grasping force, and to command the augmenting tensile force from the TDS.

8. The device of claim 7, wherein each of the plurality of sensors is configured as a load cell, and positioned on a respective one of the distal phalange rings in proximity to a distal end of a respective finger of the operator.

9. The device of claim 7, wherein the plurality of tendons is five tendons, and wherein the TDS includes one of: a single actuator connected to all five of the tendons, and five actuators each connected to a corresponding one of the five tendons.

10. The device of claim 7, wherein the TDS includes a user interface configured to receive and record a preferred amount of the augmenting tensile force.

11. The device of claim 7, wherein the TDS includes a battery and a servo motor, and wherein the microcontroller is configured to selectively energize the servo motor using the energy supply to thereby generate the augmenting tensile force.

12. The device of claim 11, wherein the TDS includes a ball screw drive assembly, and wherein the servo motor is configured to rotate a ball screw portion of the ball screw drive assembly to thereby generate the augmenting tensile force.

13. The device of claim 7, wherein the glove includes material that is wearable on a hand of an operator, the TDS is at least partially enclosed within the sleeve, and the sleeve is configured to wrap around a forearm of the operator.

14. The device of claim 7, wherein the tendons are constructed at least partially of a braided polymer material and enclosed within a flexible conduit for at least part of the lengths of the tendons.

15. A method of augmenting a grasping force of an operator, the method comprising:
positioning a plurality of phalange rings on each finger of a glove, including at least a medial and a distal phalange ring for each finger, such that the phalange rings circumscribe a respective one of the fingers of the glove;
positioning contact sensors on at least some of the phalange rings;
routing a flexible tendon, on each finger of the glove, through the medial phalange ring and connecting the routed tendon to the distal phalange ring;
measuring a grasping force applied by the operator using the contact sensors;
encoding the measured grasping force as a set of feedback signals;
calculating an augmenting tensile force as a function of the feedback signals using a microcontroller; and
energizing a tendon drive system (TDS) of the device, wherein the TDS includes a plurality of actuators each connected to a respective one of the tendons, to thereby move the fingers of the glove.

16. The method of claim 15, further comprising:
recording a preferred amount of the augmenting tensile force using a user interface; and
calculating the augmenting tensile force as a function of the feedback signals and the preferred amount of augmenting tensile force.

17. The method of claim 15, wherein the actuator is configured as a ball screw-type drive assembly, and wherein energizing the at least one actuator includes selectively connecting a servo motor to a battery to cause a rotation of a ball screw portion of the ball screw-type drive assembly to thereby generate the augmenting tensile force.

* * * * *